US012231854B2

(12) United States Patent
Tabak et al.

(10) Patent No.: US 12,231,854 B2
(45) Date of Patent: Feb. 18, 2025

(54) HEARING DEVICE

(71) Applicant: Sonion Nederland B.V., Hoofddorp (NL)

(72) Inventors: Umut Tabak, Hoofddorp (NL); Raymond Mogelin, Hoofddorp (NL)

(73) Assignee: Sonion Nederland B.V., Hoofddorp (NL)

( * ) Notice: Subject to any disclaimer, the term of this patent is extended or adjusted under 35 U.S.C. 154(b) by 178 days.

(21) Appl. No.: 18/005,738

(22) PCT Filed: May 27, 2021

(86) PCT No.: PCT/NL2021/050335

§ 371 (c)(1),
(2) Date: Jan. 17, 2023

(87) PCT Pub. No.: WO2022/019752

PCT Pub. Date: Jan. 27, 2022

(65) Prior Publication Data

US 2023/0345189 A1 Oct. 26, 2023

(30) Foreign Application Priority Data

Jul. 24, 2020 (NL) ..................................... 2026135

(51) Int. Cl.
*H04R 25/00* (2006.01)

(52) U.S. Cl.
CPC ......... *H04R 25/604* (2013.01); *H04R 25/656* (2013.01); *H04R 2225/023* (2013.01); *H04R 2225/57* (2019.05); *H04R 2460/11* (2013.01)

(58) Field of Classification Search
CPC ................ H04R 25/604; H04R 25/656; H04R 2225/57; H04R 2225/023; H04R 2460/01
USPC .......................................................... 381/322
See application file for complete search history.

(56) References Cited

U.S. PATENT DOCUMENTS

| | | | |
|---|---|---|---|
| 9,237,394 B2 | 1/2016 | Seo et al. |
| 2002/0027996 A1 | 3/2002 | Leedom et al. |
| 2005/0221167 A1 | 10/2005 | Fushimi et al. |
| 2010/0166241 A1 | 7/2010 | Sabio |
| 2014/0016808 A1 | 1/2014 | Cherukuri et al. |

(Continued)

FOREIGN PATENT DOCUMENTS

| | | |
|---|---|---|
| EP | 0997057 A1 | 5/2000 |
| EP | 3422739 A1 | 1/2019 |

(Continued)

OTHER PUBLICATIONS

International Serach Report for International Application No. PCT/NL2021/050335 dated Jun. 22, 2021.

(Continued)

*Primary Examiner* — Phylesha Dabney
(74) *Attorney, Agent, or Firm* — Harness, Dickey & Pierce, P.L.C.

(57) ABSTRACT

A hearing device comprising a leading sealing element and a trailing receiver and valve, wherein in a longitudinal direction of the hearing device the valve is more distant from the sealing element than the receiver, and wherein the receiver and the valve each are unitary items that are separate from each other, and that the receiver and the valve are connected to each other by a flexible interlink.

6 Claims, 5 Drawing Sheets

(56) References Cited

U.S. PATENT DOCUMENTS

| | | | | |
|---|---|---|---|---|
| 2015/0136148 | A1* | 5/2015 | Cheng | H04R 1/1016 128/868 |
| 2019/0075384 | A1 | 3/2019 | Miwa | |
| 2019/0208301 | A1 | 7/2019 | Monti et al. | |

FOREIGN PATENT DOCUMENTS

| | | | |
|---|---|---|---|
| WO | WO-0076271 | A1 | 12/2000 |
| WO | WO-2005076991 | A2 | 8/2005 |

OTHER PUBLICATIONS

International Preliminary Report on Patentability for International Application No. PCT/NL2021/050335 dated Oct. 10, 2022.

* cited by examiner

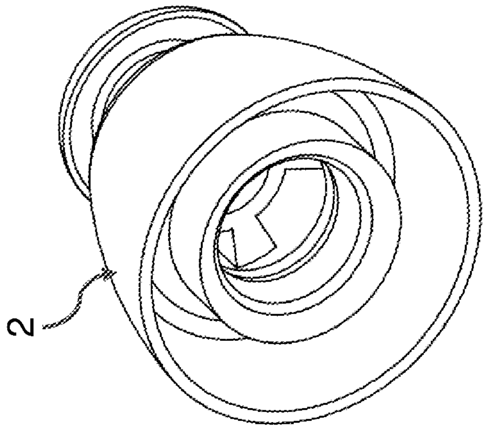
Fig. 5.1
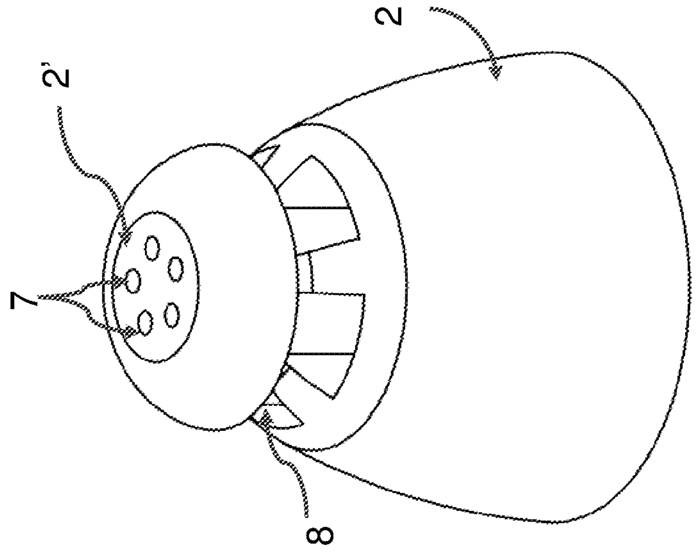
Fig. 5.2
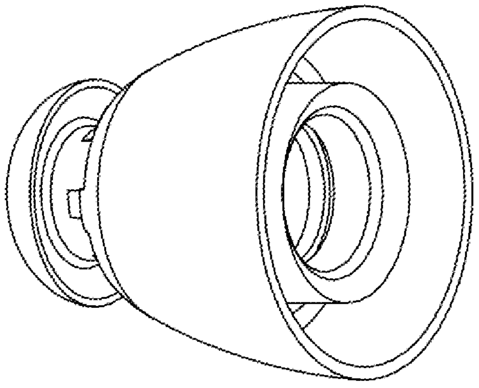
Fig. 5.3

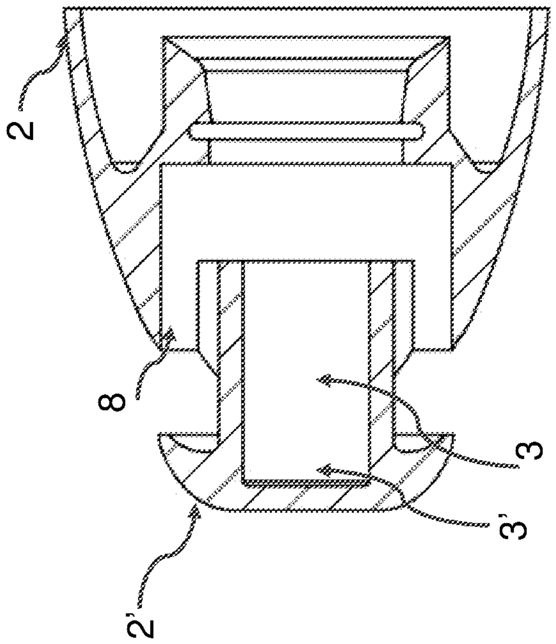
Fig 6.2
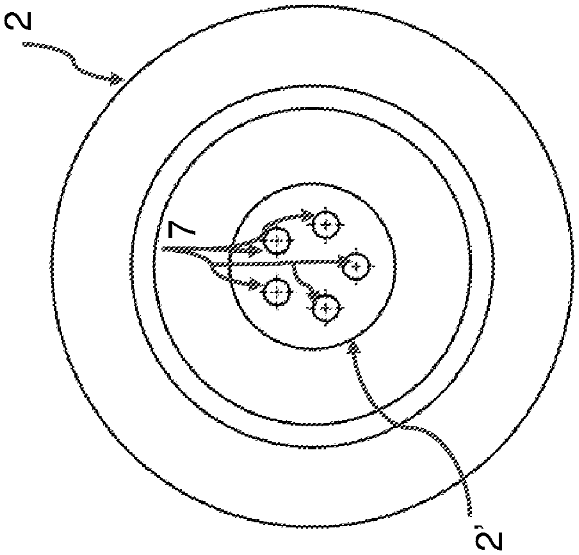
Fig 6.1

HEARING DEVICE

CROSS-REFERENCE TO RELATED APPLICATIONS

This application is a national phase under 35 U.S.C. § 371 of PCT International Application No. PCT/NL2021/050335 which has an International filing date of May 27, 2021, which claims priority to Netherlands Patent Application No. 2026135, filed Jul. 24, 2020, the entire contents of each of which are hereby incorporated by reference.

The invention relates to a hearing device comprising a leading sealing element and a trailing receiver and valve, wherein in a longitudinal direction of the hearing device the valve is more distant from the sealing element than the receiver. The sealing element is usually also referred to as a dome.

Such a hearing device is disclosed by US2019/0208301.

One of the problems of the known hearing device is that negotiating bends in a user's ear canal is cumbersome, and accordingly easy placement of the known hearing device is impaired.

It is an object of the invention to make negotiating bends in the user's ear canal more easy and to enable easy placement of the hearing device in a user's ear canal.

It is also an object of the invention to provide a better fit and more comfort for the user.

It is another object of the invention to achieve advantages as will become apparent from the following disclosure; such as improving the sound quality experienced by the user.

US2002/0027996 representing the preamble of the main claim discloses a hearing device comprising a leading sealing element and a trailing receiver and a trailing valve, wherein in a longitudinal direction of the hearing device the valve is more distant from the sealing element than the receiver, wherein the sealing element, the receiver and the valve each are unitary items that are separate from each other, and that the receiver and the valve are connected to each other by a flexible interlink.

The hearing device of the invention is provided with one or more features according to at least one of the appended claims. The hearing device of the invention can be embodied as a hearing aid, a bearable, a hearing instrument, as earbuds and the like.

In a first aspect of the invention a front end of the receiver is received in the sealing element and engages a frontal portion of the sealing element, which frontal portion is equipped with apertures to enable sound from the receiver to escape to a region in front of the sealing element. The audio quality provided to the user is therewith improved. Further the sealing element is equipped with sealing element holes behind a frontal portion of the sealing element to enable external sounds passing the valve to enter the ear canal of the user in front of the sealing element. This means that the sounds will burst into the ear canal to directly impact the eardrum. Since the distance between sealing element and valve is comparatively short when the receiver engages the frontal portion of the sealing element, also the quality of the external sounds reaching the eardrum of the user can be at a comparatively high level. By making the sealing element, the receiver and the valve separate items, and by connecting the receiver and the valve by a flexible interlink, the hearing device of the invention facilitates easy negotiating of bends in the ear canal of the user.

In connection with the ease of negotiating bends the interlink is preferably arranged with a degree of flexibility to enable flexing of the interlink between the receiver and the valve by the mere progressing of the hearing device into an ear canal of a user.

Suitably the interlink has a flexural modulus in the range 200-1200 MPa as measured according to ASTM D790, ISO 527-½ or ISO 178.

Further it is preferred that the interlink has a diameter in the range 0.6-1.0 mm.

Suitably the interlink comprises material selected from the group Rilsan, silicone, Pebax. This implies that also mixtures of these materials can be applied, and it does not exclude the use of other materials that are not mentioned.

The flexibility of the device is further promoted by arranging that the interlink, the receiver and the valve are rotatable with respect to each other around a longitudinal axis through the interlink.

A preferential arrangement is that the sealing element is embodied as a custom fit hard shell so as to tailor the hearing device to anatomical features of the user.

It is preferred that the valve is electro-magnetically actuable. This enables the user to close the valve and exclude external sounds from reaching the eardrum at will, i.e. in a situation that for instance the outside noises are at a too high level for the user to benefit from the sounds received from the receiver.

The invention will hereinafter be further elucidated with reference to the drawing of an exemplary embodiment of a hearing device according to the invention that is not limiting as to the appended claims.

Figure 1:
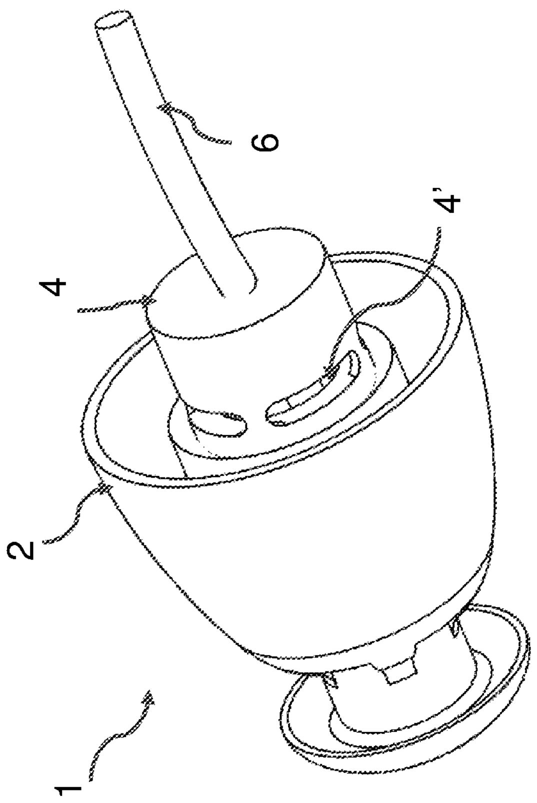
FIG. 1 shows a hearing device of the invention in a side view.

FIGS. 5.1-5.3 shows the sealing element of the hearing device of the invention in a bottom view, a side view and an oblique side view respectively; and FIGS. 6.1 and 6.2 show a top view and a sectional side view of part of the hearing device of the invention.

Whenever in the figures the same reference numerals are applied, these numerals refer to the same parts.

Figure 2:
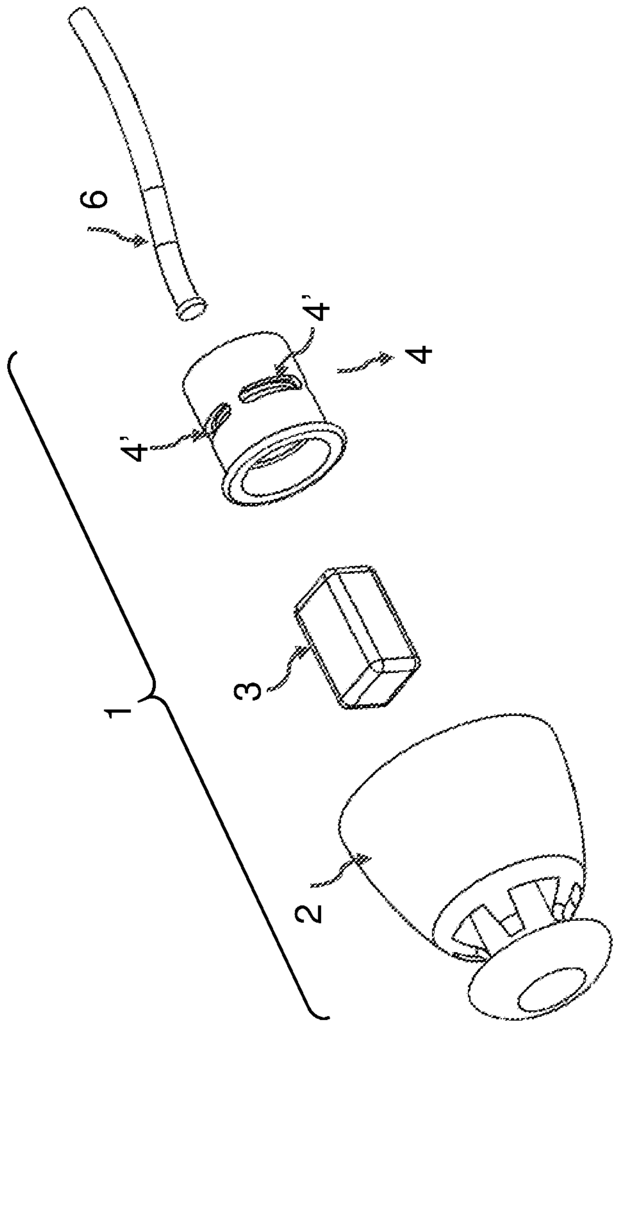
FIG. 2 shows the hearing device of the invention in an exploded view.
Figure 3:
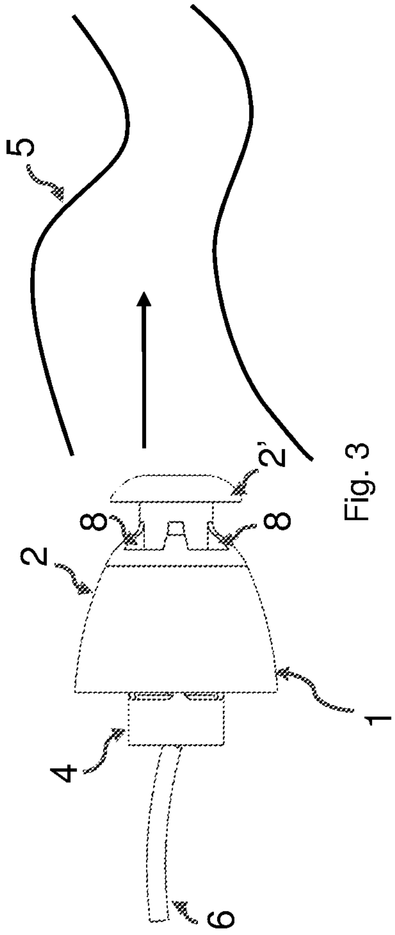
FIG. 3 shows the hearing device of the invention entering an ear canal.

FIGS. 1-3 show that the hearing device 1 of the invention comprises a leading sealing element 2 and a trailing receiver 3 (only visible in FIG. 2) and trailing valve 4, wherein in a longitudinal direction of the hearing device 1, i.e. in a movement direction of the hearing device 1 when placed in an ear canal 5 of a user, the valve 4 is more distant from the sealing element 2 than the receiver 3. In other words: the receiver 3 is positioned between the sealing element 2 and the valve 4.

Figure 4:
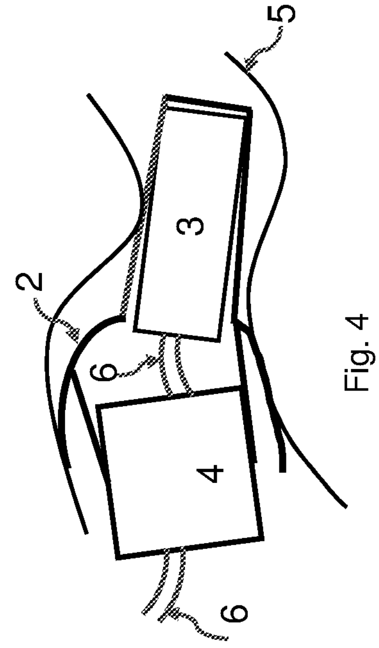
FIG. 4 shows the hearing device of the invention schematically after it has entered the ear canal.

According to an aspect of the invention the sealing element 2, the receiver 3 and the valve 4 are separate units, i.e. the receiver 3 and the valve 4 are separate items that are distinct from each other, wherein the receiver 3 and the valve 4 are connected to each other by a flexible interlink 6, which assists the hearing device 1 to easily negotiate bends in the air canal 5 as is schematically shown in FIG. 4.

Preferably the interlink 6 is arranged with a degree of flexibility to enable flexing of the interlink between the receiver 3 and the valve 4 when the hearing device 1 is made to progress into an ear canal 5 of a user. Suitably the interlink 6 has a flexural modulus in the range 200-1200 MPa as measured according to ASTM D790, ISO 527-½ or ISO 178. Further suitably the interlink 6 has a diameter in the range 0.6-1.0 mm. One thing and another can be easily be accomplished when the interlink 6 comprises material selected from the group Rilsan and Pebax.

FIG. 4 shows schematically a constructional detail which is better shown in FIG. 6.2, i.e. that a front end 3' of the receiver 3 is received in the sealing element 2, such that the front end 3' of the receiver 3 engages a frontal portion 2' of the sealing element 2. FIG. 6.1 shows that said frontal portion 2' is equipped with apertures 7 to enable sound from the receiver 3 to escape to a region in front of the sealing element 2. This is also shown in FIG. 5.2.

Another aspect that is shown in FIG. 5.2 is that the sealing element 2 is equipped with sealing element holes 8 behind a frontal portion 2' of the sealing element 2 to enable external sounds that are passing the valve 4 to enter the ear canal 5 of the user in front of the sealing element 2. Such sounds can pass the valve 4 through the valve openings 4' as depicted in FIG. 1. Preferably the valve 4 is electro-magnetically actuable for closing or opening the valve openings 4', for instance in the manner as shown in EP 3 471 432 and EP 3 471 433 in the name of the applicant.

Although the invention has been discussed in the foregoing with reference to an exemplary embodiment of the hearing device of the invention, the invention is not restricted to this particular embodiment which can be varied in many ways without departing from the invention. The discussed exemplary embodiment shall therefore not be used to construe the appended claims strictly in accordance therewith. On the contrary the embodiment is merely intended to explain the wording of the appended claims without intent to limit the claims to this exemplary embodiment. The scope of protection of the invention shall therefore be construed in accordance with the appended claims only, wherein a possible ambiguity in the wording of the claims shall be resolved using this exemplary embodiment.

The invention claimed is:

1. A hearing device comprising a leading sealing element and a trailing receiver and trailing valve, wherein in a longitudinal direction of the hearing device the valve is more distant from the sealing element than the receiver, wherein the receiver and the valve each are unitary items that are separate from each other, and that the receiver and the valve are connected to each other by an interlink, characterized in that the interlink is flexible to enable flexing of the interlink between the receiver and the valve by a mere progressing of the hearing device into an ear canal of a user, and in that a front end of the receiver is received in the sealing element and engages a frontal portion of the sealing element, which frontal portion is equipped with apertures to enable sound from the receiver to escape to the ear canal of the user in front of the sealing element, and that the sealing element is equipped with sealing element holes behind the frontal portion of the sealing element to enable external sounds passing the valve through valve openings 4' to enter the ear canal of the user in front of the sealing element.

2. The hearing device according to claim 1, wherein the interlink has a flexural modulus in a range of 200-1200 MPa as measured according to ASTM D790, ISO 527-½ or ISO 178.

3. The hearing device according to claim 1, wherein the interlink has a diameter in a range of 0.6-1.0 mm.

4. The hearing device according to claim 1, wherein the interlink comprises material selected from the group consisting of Rilsan, silicone, and Pebax.

5. The hearing device according to claim 1, wherein the interlink, the receiver and the valve are rotatable with respect to each other around a longitudinal axis through the interlink.

6. The hearing device according to claim 1, wherein the valve is electromagnetically actuable.

* * * * *